United States Patent

[11] 3,614,178

| [72] | Inventor | Richard R. Stamm<br>Brookfield, Wis. |
|---|---|---|
| [21] | Appl. No. | 4,317 |
| [22] | Filed | Jan. 20, 1970 |
| [45] | Patented | Oct. 19, 1971 |
| [73] | Assignee | Superior Die Set Corporation<br>Oak Creek, Wis. |

[54] BALL BEARING FOR DIE SET LEADER PIN
3 Claims, 4 Drawing Figs.

| [52] | U.S. Cl. | 308/4 C,<br>308/6 B |
|---|---|---|
| [51] | Int. Cl. | F16c 29/00 |
| [50] | Field of Search | 308/4 C, 6<br>B, 6 |

[56] References Cited
UNITED STATES PATENTS

| 2,774,430 | 12/1965 | Blazek | 308/4 C |
|---|---|---|---|
| 2,846,278 | 8/1958 | Blazek | 308/6 B |
| 3,253,868 | 5/1966 | Danly | 308/6 B |
| 3,357,755 | 12/1967 | Danly | 308/6 B |
| 3,469,893 | 9/1969 | Hudson | 308/6 |

*Primary Examiner*—Martin P. Schwadron
*Assistant Examiner*—Barry Grossman
*Attorney*—Wheeler, House & Wheeler ABSTRACT: A cage intervening between a leader pin and bushing in a die set is provided with ball bearings which guide the leader pin. As the leader pin moves in the bushing, the bearings roll between the leader pin and bushing, and the cage is caused to advance in a corresponding direction at half the rate of the leader pin. A spiral coiled spring fixed to the leader pin has its lowermost coil closely fitted within the bushing at substantially the radius of the cage where it can collapse under the leader pin in the lowest position thereof. At full length it supports the cage in elevated leader pin positions such that the cage might otherwise be released to depart from the desired relationship between the relatively movable parts.

PATENTED OCT 19 1971　3,614,178
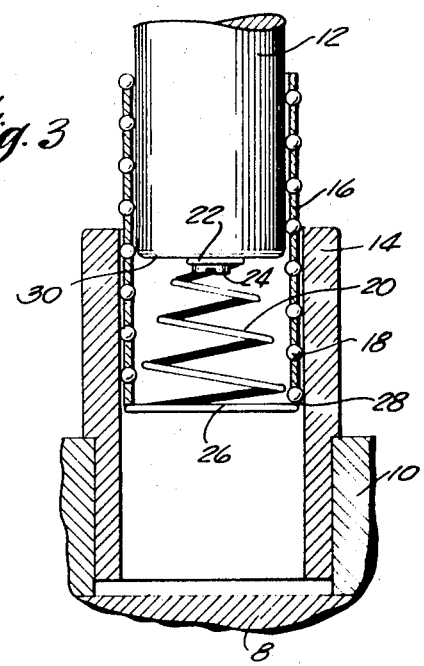
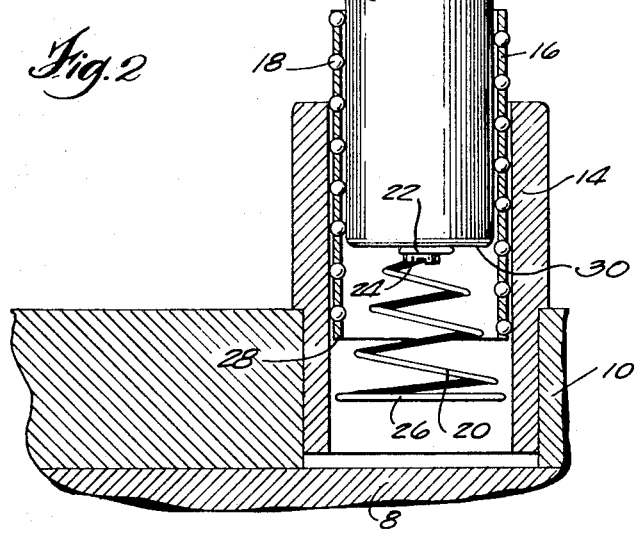
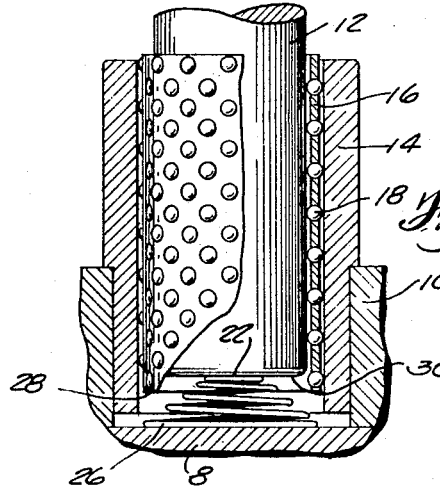
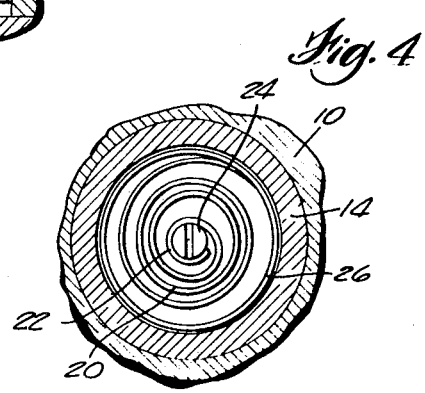
Inventor
Richard G. Stamm
By
Wheeler, Wheeler, House & Clemency
Attorneys

BALL BEARING FOR DIE SET LEADER PIN

BACKGROUND OF INVENTION

Because of the movement of the cage at half the speed of the leader pin, a range of cage movement should be provided in which the cage will start from a carefully predetermined position at each end of the leader pin stroke. It is known to provide a means of supporting the cage from the leader pin for defining the uppermost cage position. However, some devices for this purpose extend materially below the end of the leader pin thus requiring either that the overall height of the apparatus be unduly increased or that clearance be provided below the level of the lower platen. Ordinarily the lower platen rests on the bed of a press, in which it is undesirable to make an opening. Therefore, any means of supporting the cage must be susceptible of collapsing in the lowermost position of the leader pin. At the same time, it is necessary, in order that the supporting means may perform its desired function that it must extend very materially below the lower end of the leader pin when the leader pin is in an elevated position.

SUMMARY OF INVENTION

The problems in connection with a device of this type are solved through the use of the disclosed helical spiral spring fixed at its apex to the leader pin and having all of its other coils free and of progressively increasing diameter, whereby the outermost coil underlies the bearing cage to provide support for it and pick it up as the leader pin leaves the bushing.

BRIEF DESCRIPTION OF DRAWINGS

FIG. 1 is a view showing a die set platen and parts of the platen and press bed with the leader pin close to its lowest position, the press bed and platen being fragmentarily illustrated in section, the leader pin and spring being shown in elevation and the ball cage being shown partially in elevation and partially in section.

FIG. 2 is a similar view showing the leader pin partially elevated and illustrating the ball cage in section. The upper platen of the die set is fragmentarily illustrated in section.

FIG. 3 is a view showing the leader pin raised to an elevation in which the lower coil of the spring is supporting the ball cage.

FIG. 4 is a plan view of the spring.

DETAILED DESCRIPTION

The press bed 8 is fragmentarily illustrated. Mounted thereon is the lower platen 10 of a conventional die set. The leader pin 12 is mounted in the upper platen 11 and is shown in FIG. 1 to be fully engaged in the bushing 14 carried by platen 10.

To facilitate reciprocative movement of the leader pin in the bushing, a conventional cage 16 is fitted between these parts and provided at intervals about its periphery with bearing balls 18 which engage both the leader pin and the bushing, the cage being shown in FIG. 1 in the position which it occupies when the leader pin is near maximum depth in the bushing.

A spiral helical spring 20 has the eye portion 22 at its smaller end connected by screw 24 with the lower end of the leader pin 12. A terminal spring coil 26 is only slightly smaller in diameter than the interior of the bushing 14. Each successive coil is readily receivable into the next larger coil so that in the lowermost position of the leader pin the spring collapses to become almost flat beneath the leader pin. In this relative position of the parts, the lower end 28 of cage 16 has stopped its downward movement slightly above the lower end of bushing 14. In FIG. 1, the leader pin and cage are shown slightly above their ultimate lowermost position, the objective being to picture the coils of the spring when the spring is nearly collapsed. In the lowest leader pin position, the spring may be substantially flat.

In the normal operation of the press, the leader pin 12 will be carried upwardly from the position of FIG. 1 through the position of FIG. 2 to or even beyond the position in which it is shown in FIG. 3. As the balls 18 are rotated on the inner surface of the bushing 14 by friction of the upward movement of the leader pin 12, the balls and the cage are caused to move upwardly within the bushing at half the ascending rate of the leader pin. Thus when the lower end 30 of the leader pin is a considerable distance above the lower end 28 of the cage, as shown in FIG. 2, the lower end of the cage is spaced for a considerably greater distance below the end of the leader pin than it was in the position of the parts shown in FIG. 1. Although the leader pin and the spring 20 attached thereto are rising twice as rapidly as the cage, the expansion of spring 20 to its normal unflexed position shown in FIG. 2 has left the lowest coil 26 of the spring well below the bottom margin 28 of the cage.

When the leader pin 12 reaches the position shown in FIG. 3, the lowest coil 26 of spring 20 will overtake, and engage, the lower end 28 of cage 16, thereby providing support for the cage. This is particularly important if the leader pin continues its upward movement beyond the position shown in FIG. 3, as commonly happens. Since leader pin is no longer engaging, and is ceasing to cause rotation of, the bearing balls which are engaged with the bushing, the half rate movement of the cage will not occur above the level of FIG. 3 and the desired relationship between the cage and the leader pin will be lost if support for the cage is not provided as herein disclosed. It will be apparent that in all positions of the leader pin at and above the relationship shown in FIG. 3, the lowest coil 26 of spring 20 will support the cage in the desired relationship to the leader pin. While the spring is capable of being collapsed under pressure, it will have sufficient tensile strength when expanded to its normal unflexed position shown in FIGS. 2 and 3 so that it will support the cage. But for such support, the leader pin would withdraw from the cage (or the cage would fall from the leader pin) and an entirely new relationship between the cage and the leader pin would be created on the subsequent descent of the leader pin.

In the instant arrangement, the cage is supported from the leader pin no matter how high the leader pin may go and when the cage reenters the bushing, it will have normal rolling contact of its balls with the leader pin to effect normal relative movement within the desired range.

By way of example and not by way of limitation, some illustrative characteristics of the spring 20 are supplied.

For a cage for ⅛-inch balls for a 1¼-inch diameter pin, and having a length of 2 3/8 inches and a 1 1/32-inch lead, I use a spring of wire size 0.0915 inches with an internal diameter of nine thirty-seconds and an overall diameter of 1 15/32 and a length of 1⅛ overall.

If the leader pin had a diameter of 1½ inches, I would use for a cage of appropriate diameter and dimensions otherwise similar to those above, a spring of the same length but 1 23/32 in overall diameter.

Preferably all springs are made of chromium silicon steel SAE–9254, heat-treated to 50–52 Rockwell C. For cages having ⅛-inch diameter balls, the spring is 0.0915-inch wire; for cages having ¼-inch diameter balls, the spring is 0.125-inch diameter wire. At their larger ends, the springs are approximately one sixty-fourth inch larger in diameter than the inside diameter of the cage.

For general purpose die sets where the cage is shorter than the bushing and the pin does not project through the cage bushing, prefer that the spring length equal one-half of the difference obtained by subtracting ball diameter from cage length.

For a 2-inch diameter pin, a ¼-inch ball cage would be used. If the cage length were 4¼ inches long, I would use a spring made from ⅛-inch wire having an inside diameter at the apex of thirteen thirty-seconds inches, an O.D. at the bottom of approximately 2 9/32 inches and an overall height of 2 inches. This spring would allow the cage to lead the pin by 1 7/8 inches at the start of the stroke.

I claim:

1. A die set comprising in combination a relatively reciprocable bushing and leader pin, a ball cage interposed between the leader pin and bushing, and means for determining the start of the range of relative movement between the leader pin and the cage of the bushing, said means comprising a spring having its upper end connected with the leader pin and having at its lower end an annular support underlying the cage.

2. A die set according to claim 1 in which the spring is a spiral helical spring having a large coil underlying the cage and constituting said support and other coils extending above said large coil within the interior diameter of the cage and connected with the leader pin, said spring normally having substantial axial height and being collapsible beneath the leader pin in the descent of the leader pin.

3. A die set according to claim 2 in which the successive coils of the spring are collapsible within one another without interference so that the spring is substantially flat when fully collapsed, the spring in its normal unflexed position having successive coils rising spirally to an overall height representing substantially maximum range of movement between the leader pin and the ball cage, said spring having sufficient bias to carry the ball cage with the leader pin in continued upward movement of the leader pin with respect to the bushing.